United States Patent [19]
Bennett et al.
[11] 3,757,040
[45] Sept. 4, 1973

[54] WIDE ANGLE DISPLAY FOR DIGITALLY GENERATED VIDEO INFORMATION

[75] Inventors: William S. Bennett, Chenango Bridge; Albert F. Collier, Harpursville; Arthur Roger Taylor, Kirkwood, all of N.Y.

[73] Assignee: The Singer Company, Binghamton, N.Y.

[22] Filed: Sept. 20, 1971

[21] Appl. No.: 182,024

[52] U.S. Cl. ................ 178/6.8, 178/7.85, 178/7.92, 178/DIG. 20, 315/26, 315/27 GD, 340/324 A
[51] Int. Cl. ......................... H01j 29/70, H04n 7/18
[58] Field of Search ..................... 178/6.8, DIG. 20, 178/35, 6.7 R, 7.92, 7.85; 340/324 A; 315/26, 27 GD

[56] References Cited

UNITED STATES PATENTS

| | | | |
|---|---|---|---|
| 3,557,304 | 1/1971 | Rue | 178/6.8 |
| 3,659,920 | 5/1972 | McGlasson | 178/DIG. 35 |
| 3,054,854 | 9/1962 | Neasham | 178/6.7 R |

*Primary Examiner*—Howard W. Britton
*Attorney*—Francis L. Masselle, John C. Altmiller et al.

[57] ABSTRACT

A method and apparatus for displaying information stored for display on a planar surface onto a wide angle spherical display by painting on the display a spherical raster of great circle formed by the intersections of planes passing through the center of the sphere and raster lines on a nominal display plane and retreiving the stored information non-linearly so that it will properly map on the great circles is shown.

3 Claims, 6 Drawing Figures

Arthur B. Taylor,
Albert F. Collier INVENTORS.
and William S. Bennett
BY
John C. Altmiller
AGENT Arthur R. Taylor
Albert F. Collier INVENTORS.
and William S. Bennett
BY
John C. Altmiller
AGENT Arthur R. Taylor,
Albert F. Collier
and William S Bennett
INVENTORS.

BY
John C. Altmiller
AGENT

Arthur R. Taylor,
Albert F. Collier and William S. Bennett INVENTORS.
BY
John C. Altmiller
AGENT Arthur R. Taylor
Albert F. Collier and William S. Bennett
INVENTORS.
BY
John C. Altmiller
AGENT

WIDE ANGLE DISPLAY FOR DIGITALLY GENERATED VIDEO INFORMATION

This invention relates to visual display systems in general and more particularly to a method of displaying an image stored in planar form onto a non-planar display.

In display systems such as those used with simulators and trainers the image sources used normally have their information stored in planar form. For example, in a system using film, the film image will normally be suitable for projection on a flat screen. Likewise, if the film is scanned by a TV camera or flying spot scanner, the result is such that it should be displayed on a flat CRT. The same result obtains when a television camera views a camera model system to develop an image since the image is displayed on a flat-faced tube. These are well known image generation techniques used in the simulator art.

A new type of image generator which also has its image stored in the same form has been recently developed. These are image generators which generate images of three dimensional scenes or objects by means of digital computer and are generally referred to as digital image generators (DIG). Such systems are presently being considered for use in various types of simulator visual display systems.

A discussion of the methods involved in generating such images is beyond the scope of this specification. However, such an image generator is described in Technical Report System Definition Study for the Primary Visual System for the ASUPT Program prepared by the Apollo Systems, Space Division, General Electric Company, Daytona Beach, Florida under Contract F33–615–69–C–1883.

For the purposes of the system to be described herein only a few characteristics of the image generation system need be known. Image information is generated in the computer on a line-by-line basis for display on a flat surface. Each line is divided into a certain number of elements corresponding to uniformly spaced image positions on a plane. Selected elements of these positions indicate when a color change is required. These elements are normally read out of the computer at a constant rate for conversion to video information and display.

When information of this nature is to be used in an infinity image display system various problems arise. Both refractive and reflective infinity image systems have limited fields of view. Thus, no matter how large an angular field of view the image generator may be able to produce, it is effectively limited by the display system. When a reflective mirror-beamsplitter system is employed an additional problem arises in that the input information must be in spherical rather than planar form, since the display surface is spherical in shape.

In general, in the past, where a field of view larger than that obtainable from a single display was required, a plurality of displays were joined, each having its own input source. Thus, if three displays were required, three TV cameras and projectors or CRTs were required, three movie projectors required, or three digital image generator output channel equipment units were required.

In many cases the reflective mirror-beamsplitter is the type of display preferred in simulator visual systems. Until recently no practical method of joining such displays to form a larger display has been available. There are available now two methods to combine these type displays. One resulted from the development of the in-line infinity optical system and is described in the above referenced report. The other is described in U.S. Letters Pat. No. 3,659,920 issued on an application Ser. No. 67,385 of F. McGlasson on Aug. 27, 1970. Each type display combination results in a display surface which is spherical in shape.

As previously mentioned, the primary method used to provide image input information to a wide angle display comprising a plurality of narrow angle displays has been to provide a separate image generator channel for each display channel. A method of displaying a single image input on a plurality of narrow angle displays combined to form a wide angle display is disclosed in U.S. Letters Pat. No. 3,697,681 issued on an application Ser. No. 66,729 of R. McCoy on Aug. 25, 1970. This method depends on having continuous raster lines across the several individual display devices making up the total display, and discloses how this may be accomplished. When used with a spherical display the method requires special raster shaping to obtain a raster which forms lines of latitude. A method of obtaining such a raster is disclosed in U.S. Letters Pat. No. 3,719,817 issued on an application Ser. No. 130,217 of R. McCoy et al. on Apr. 1, 1971.

However, when using the type of display disclosed in the McCoy and McCoy et al. applications the input image must be transformed to map properly on the spherical display. That is, scans across the image source will be curved and not straight as in the standard TV raster scan. A method of scanning for this type display is disclosed in application Ser. No. 211,372 filed by B. Woycechowsky on Dec. 23, 1971. This method works well but has drawbacks in that a great number of computations must be done at high frequencies. It also means that if a DIG input is to be used an intermediate image will be required since it has not been feasible to scan a digitally stored image with a curved scan line.

Thus, there is a need for a system which will allow information in planar form on an image to be mapped onto a spherical surface in a manner such that information may be taken from the image source by scanning straight lines. This, in the case of a DIG, is an essential requirement. For film or model raster scanning, although not essential, it will make scanning much simpler.

The above referenced General Electric report recognizes this problem in providing DIG images to spherical displays. The solution described therein is to use a non linear scan on the display CRT. It also recognizes that there are problems of non uniform brightness involved and it is limited to a single display per DIG channel.

The present invention provides a method which overcomes some of these problems allowing not only a DIG but any image source which is scanned to be used as an input to a single display or to a plurality of displays which are joined in the form of spherical segments. It is also applicable to a plurality of displays arranged in the form of a cylinder and may be extended to any type display requiring planar information to be mapped on a non-planar surface.

It is a principal object of this invention to provide an economical method and apparatus for mapping image information stored on a plane, in a manner suitable for display on a plane, onto a spherical television display.

It is also an object to provide such a method and apparatus which may also be used to map such information on a cylindrical television display.

A further object is to provide such a method and apparatus where the display is scanned linearly to permit more uniform brightness and better edge sharpness.

Another object is to provide such a method and apparatus wherein a single image generator may provide an image for display on a wide angle display comprising a plurality of narrow angle displays in a simple and economical manner.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings in which.

Figure 1:
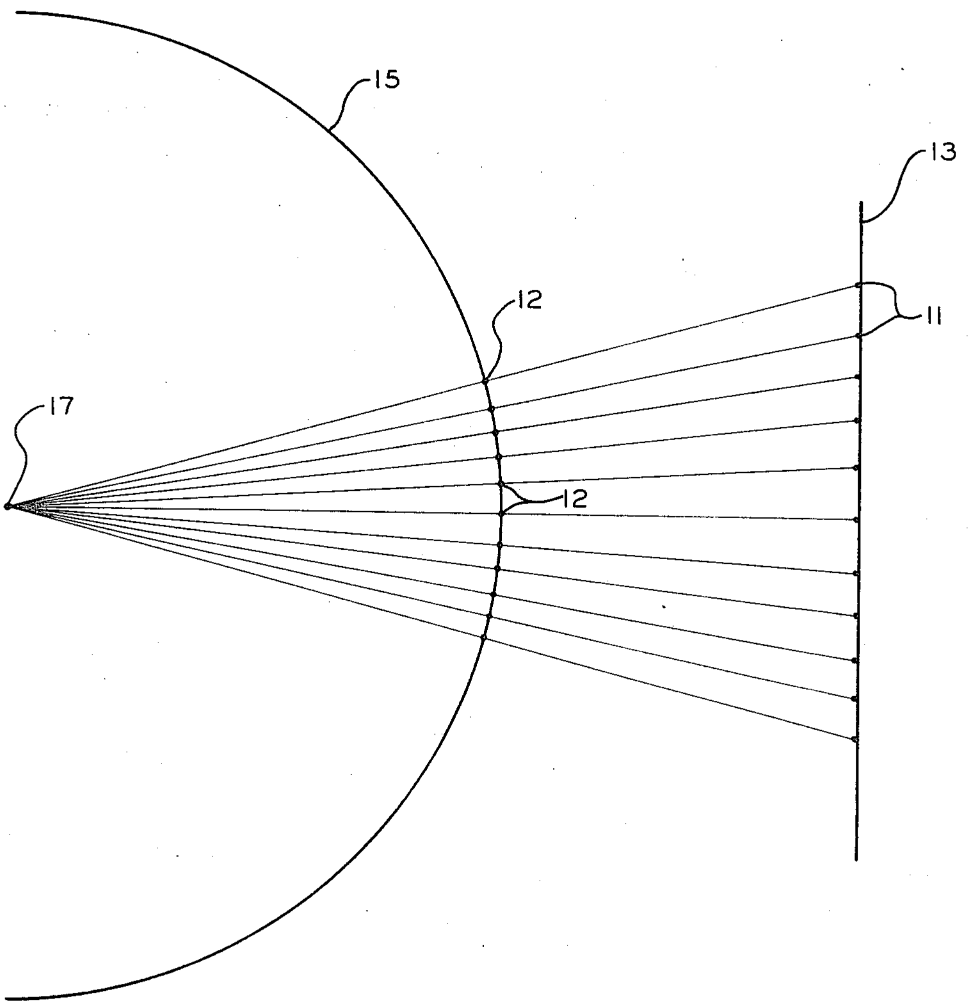
FIG. 1 is a side view illustrating the mapping of straight lines on a plane as great circles on sphere.

FIG. 1 shows a side view of the mapping of raster lines 11 in a plane 13 onto a sphere 15. It will be readily apparent that the projections 12 shown will be great circles. That is, if a plane is passed through a raster line 11 and the center 17 of sphere 15, (point 17 is also the point at which an observer would view the display) the plane will intersect the sphere on a great circle.

Figure 2:
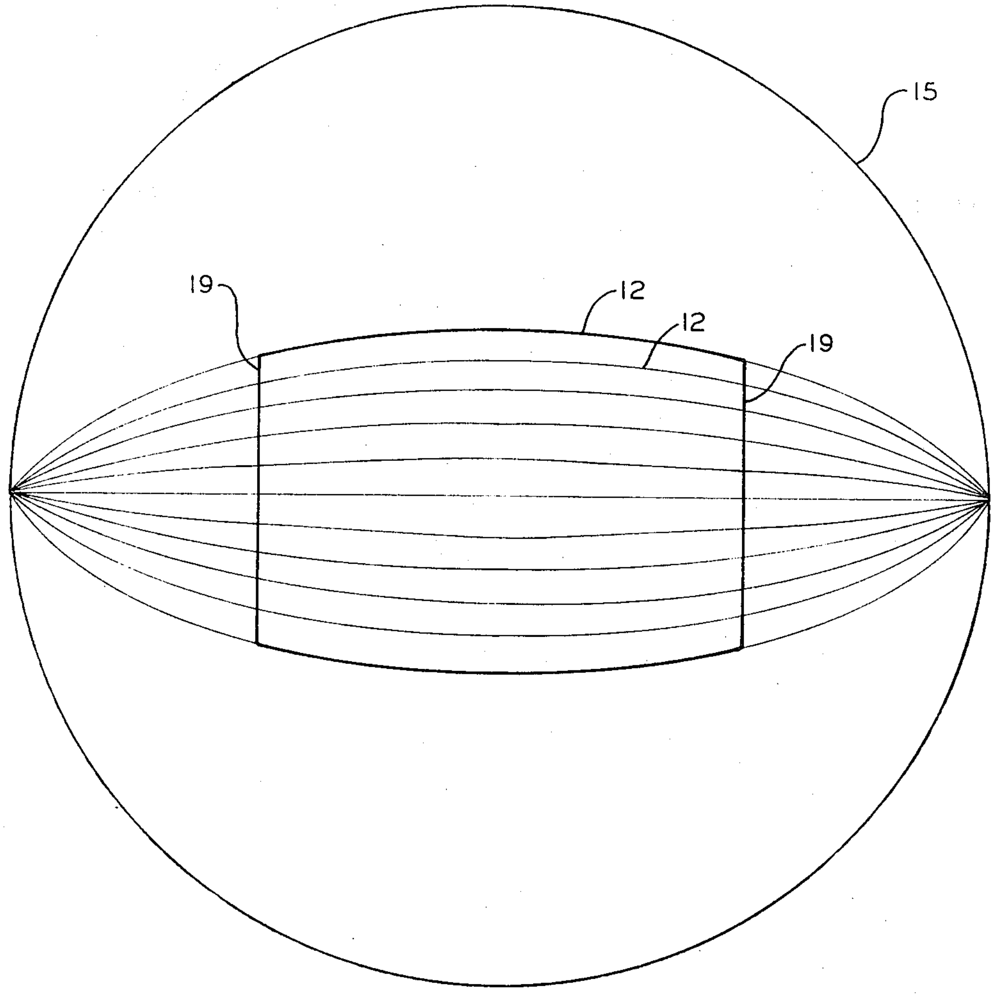
FIG. 2 is a front view of the lines of FIG. 1 mapped on the sphere.

FIG. 2 shows a front view of the projections 12 as they would appear from outside the sphere. The lines 19 indicate the projections of the ends of plane 13 of FIG. 1.

It is then evident that, if a raster of great circles is painted onto the spherical display represented in FIGS. 1 and 2 by sphere 15, the information may be obtained from the image source, represented by plane 13 in the FIGS., by scanning straight lines. Such a display raster may be obtained using the methods described in the McCoy et al application referred to above.

Figure 3:
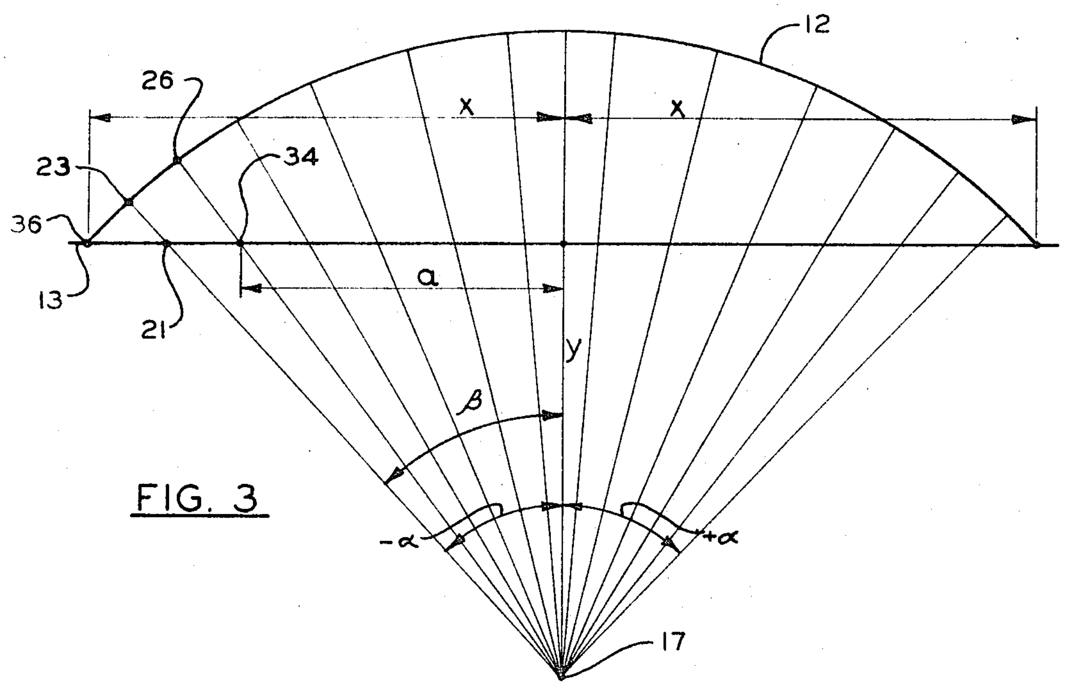
FIG. 3 is a plan view of the mapping of equidistant point on a line in the plane of FIG. 1 onto a great circle and the trigonometric relationships between points on the line and the great circle of FIG. 3.

However, one additional problem exists as will be seen from FIG. 3 which is a top view of one of the great circle projections 12. (It will be recognized that the projection of lines of plane 13 onto sphere 15 will be great circles whether the plane is outside sphere 15 as in FIG. 1 or inside as in FIG. 3) This figure illustrates the way in which information at equidistant points 21 on line 11, in plane 13 will map on a great circle 12 of sphere 15 as viewed from a viewing point 17 which is also the center of the sphere. If points 21 are scanned from the image source at a constant frequency, a non-linear display scan along line 12 will be required. That is, a scan line starting at 23 would have to move unequal distances in equal times to be at the proper spot to display the data represented by points 21 on line 13. Such a non-linear scan presents problems in uniform brightness and image element sharpness as discussed in the above referenced report.

There is, however, another way of obtaining the desired result. That is to have a linear display scan along the great circle line of sphere 12 scanning equal angles in equal time and to then obtain points 21 from the image source with a non linear scan. With this method the problems of a non-linear display scan are reduced and a picture of more uniform brightness will result.

Figure 4:
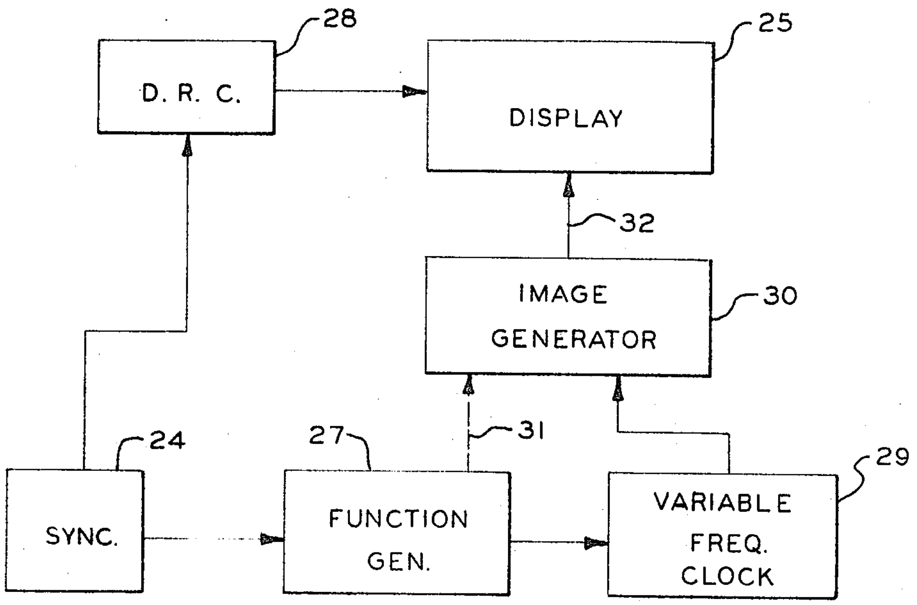
FIG. 4 is a block diagram of a preferred embodiment of the present invention for use with a single display.

FIG. 4 shows a basic block diagram of the system for one display. Sync generator 24, provides a sync command to a display raster computer 28 which will cause the raster on display 25 to scan great circles. Such a computer is disclosed in the above referenced McCoy et al. application. Sync generator 24 will also generate a scan signal which may be made to represent equal angles in equal time and thus be in one to one correspondence with the angular position of the scanning spot on display 25. This scan signal, which is commensurate with and may therefore be thought of as an angle, will be provided to function generator 27.

This linear scan which is provided by sync generator 24 must be converted in function generator 27 to provide the proper non-linear scan for the image generator 30. The input to generator 27 is represented by $\beta$ the instantaneous angular position of the spot on a great circle 12 of display 25. FIG. 3 shows this instantaneous spot position as point 26. The corresponding point on plane 13 is 34. An examination of FIG. 3 shows that with $\beta$ going from $-\alpha$ to $+\alpha$ the distance "$a$" on plane 13 as measured from a point 36 will be:

$$a = X + Y \tan \beta$$

It will be evident to those skilled in the art that such a function generator may be built using well known analog techniques.

The "$a$" output with proper scaling may be supplied as a scan signal to image generator 30 in a case of a scanned raster type device (i.e., over dotted line 31) If the image generator 30 is a DIG, a clock signal to read information out at a non-linear rate must be provided. This may be accomplished by providing the output "$a$" to a variable frequency clock 29, wherein it can be converted to a digital clock signal. For example block 29 may contain a differentiator to obtain $da/dt$ which can then be provided to a voltage controlled oscillator to obtain the required non-linear clock signal. This clock output is then provided to image generator 30 to read out the stored image information. The video output of image generator 30 is then provided over line 32 to display 25.

As mentioned previously the major limitation on field of view has been the field of view of a single display. For example, an image containing 130° of horizontal information might be possible in a DIG, on a film or from a wide angle probe in a camera model pickup. However, maximum fields of view per channel with reflective mirror-beamsplitters are in the 60° to 80° range. Thus, it is possible for one image source to provide information to two or more narrow angle displays arranged to form a wide angle display as discussed above. Using the principles disclosed in the above referenced General Electric Report, or the McGlasson application, such a wide angle display may be formed. And, using the methods disclosed in the McCoy application and those of the McCoy et al application, a continuous raster may be painted over the surface of the total display with the raster lines forming great circles. Then using the switching techniques also shown in the McCoy application video may be provided to the proper displays as the image source is scanned.

Figure 5:
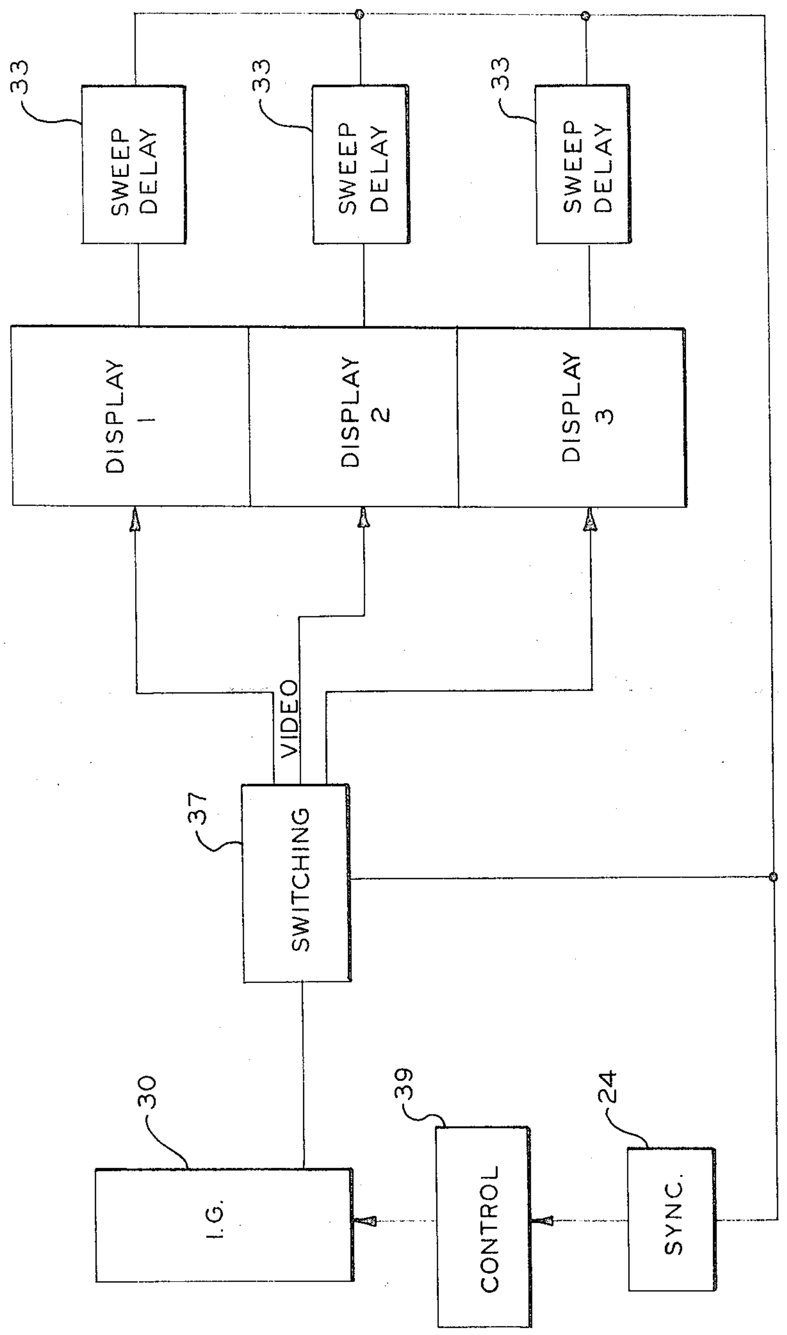
FIG. 5 is a block diagram of an embodiment of the present invention for use with a wide angle display comprising a plurality of narrow angle displays.

FIG. 5 shows a block diagram of the system for use with multiple narrow angle displays. The sync generator 24 provides signals to the fixed sweep delays 33 which provide a continuous sweep across the three displays 35, in accordance with the principles of the McCoy application. Sync is also provided to switching 37 which also operates basically as described in the McCoy application to switch the video from image generator 30 to the proper display channel. Each of the three display channels 35 will include a display 25, and display raster computer 28 shown in FIG. 4. Scan and sync signals are also provided to control block 39 which will perform the functions of the elements indicated by blocks 27 and 29 of FIG. 4.

Figure 6:
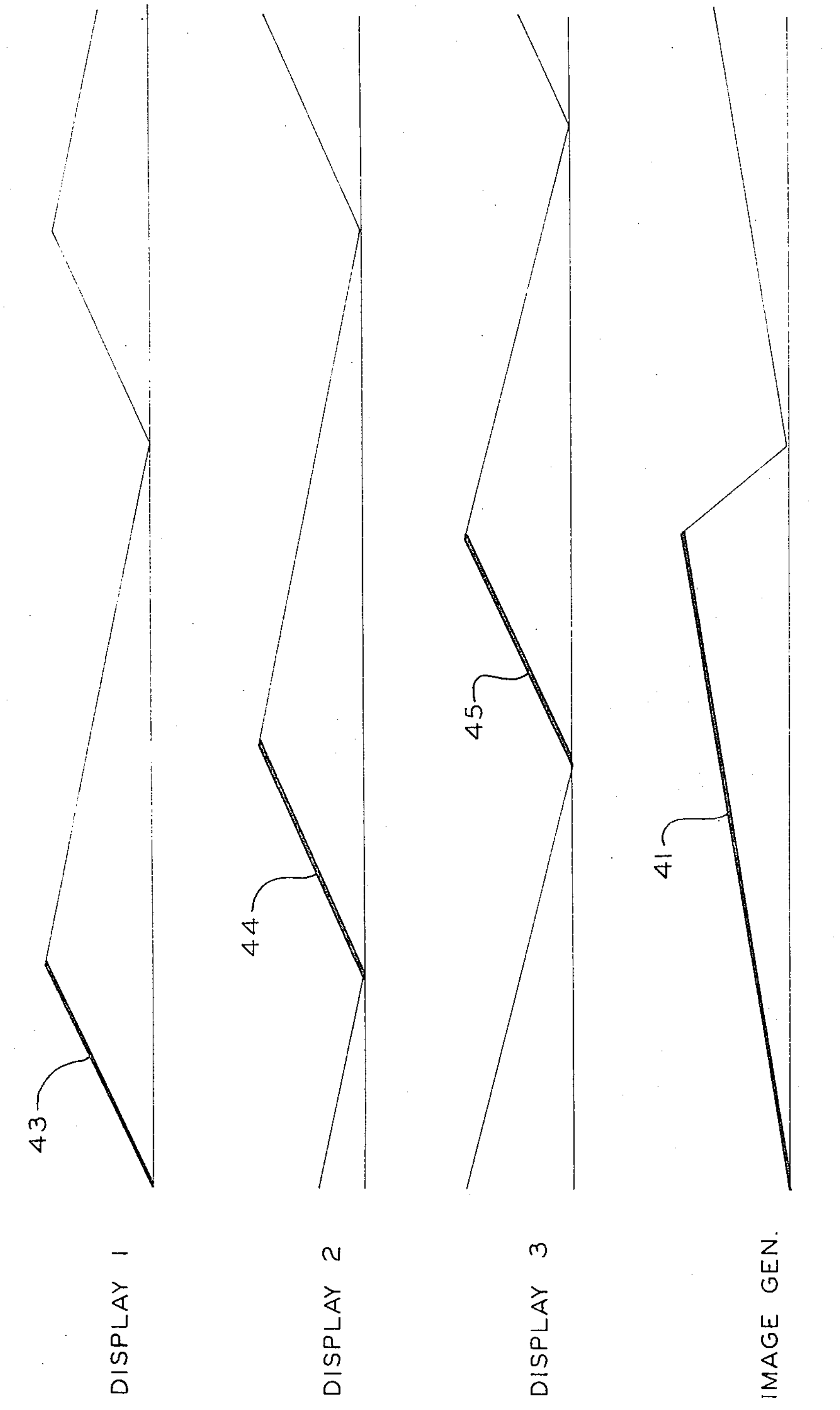
FIG. 6 illustrates waveforms required to display a single line of image generator information over three narrow angle displays.

FIG. 6 shows the types of basic sweeps required. During one sweep 41 of the image generator (active sweep portions are darkened and retrace portions light) successive sweep 43, 44 and 45 must occur respectively on the three displays of FIG. 5. Thus in accordance with the McCoy application, sync generator 24 may generate a sweep such as 43 which will be delayed to obtain 44 and 45. The sweep 41 being of a different shape will have to be independently generated in block 39 of FIG. 5 by a sweep generator such as an integrator responsive to a sync signal from sync generator 24. It will then be transformed to take into account the mapping described in connection with FIG. 3. (i.e., the sweep is shown prior to being modified by the function generator 27 of FIG. 3). The sweeps shown by 43, 44 and 45 are also shown prior to passing through display raster computer 28 of FIG. 4.

In some applications it may not be practical to scan the image non linearly as is preferred. In that case the display raster computers 28 may be designed to provide a non linear display scan and the image source scanned linearly. It is also possible to divide the non linearitys between the image generator and the display as a compromise solution.

The same basic method may also be used with cylindrical display. In that case it is evident that the lines 11 of plane 13 of FIG. 1 could be mapped as circles on the cylinder and only the corrections discussed in connection with FIG. 3 would be required (i.e., the problem of drawing a raster comprising great circles is no longer present.) Other shapes if they may be defined may also be used with the principles of the McCoy et al. display raster computer used to get the proper raster shape. That is the plane 13 of FIG. 1 may be projected onto the surface as was done with sphere 15 and a raster drawn which follows the projected shape.

Thus, a method and apparatus for mapping information stored for display on a planar surface onto a spherical or cylindrical television display which will result in the ability to scan the image in straight lines and provide more uniform brightness has been shown. It will be evident to those skilled in the art that various modifications and other applications of the invention may be made without departing from its principles. For example, it may be combined with principles of the above referenced McCoy application to provide a system where the image may be positioned anywhere on a wide angle display. Other combinations and uses with existing systems will be equally evident.

What is claimed is:

1. In a display system comprising a digital image generator and a spherical television display, apparatus to permit the images stored in said generator to be displayed on said display in the proper perspective comprising:

a. means to paint on said display a raster comprising lines which are great circle segments each line corresponding to a line of information stored in the image generator;

b. means to obtain a scan signal which is in one to one correspondence of the angular position of the spot painting said raster;

c. function generating means having said scan signal as an input and providing an output which corresponds to the corresponding position of said spot on a straight line; and d. means to obtain from said output a signal indicating the instantaneous scan rate on a straight line and to convert said signal to a variable frequency pulse train which may be used to clock the stored information out of said image generator.

2. The invention according to claim 1 wherein said display comprises a plurality of display units joined together and further including means to paint a continuous raster on said plurality of displays and to switch the video signal from said image generator to the proper ones of said displays.

3. The invention according to claim 1 wherein the spot painting said raster moves through equal angles in equal time.

* * * * *

UNITED STATES PATENT OFFICE
CERTIFICATE OF CORRECTION

Patent No. 3,757,040 Dated September 4, 1973

Inventor(s) William S. Bennett et al

It is certified that error appears in the above-identified patent and that said Letters Patent are hereby corrected as shown below:

In the Abstract, line 4, "circle" should be --circles-- and line 6, "retreiving" should be --retrieving--.

Column 2, lines 7 and 8, "Aug. 27, 1970" should be --May 2, 1972--; line 18, "Aug. 25, 1970" should be --Oct. 10, 1972--; line 27, "Apr. 1, 1971" should be --March 6, 1973--; line 34, after "in", insert --U.S. Letters Patent No. 3,725,563 issued on an--; delete "filed"; change "by" to --of--, and line 35, change "Dec. 23, 1971" to --Apr. 3, 1973--.

Signed and sealed this 25th day of June 1974.

(SEAL)
Attest:

EDWARD M.FLETCHER,JR.
Attesting Officer

C. MARSHALL DANN
Commissioner of Patents

UNITED STATES PATENT OFFICE
CERTIFICATE OF CORRECTION

Patent No. 3,757,040 Dated September 4, 1973

Inventor(s) William S. Bennett et al

It is certified that error appears in the above-identified patent and that said Letters Patent are hereby corrected as shown below:

In the drawings, Sheet 3, Fig. 3, and in the drawing on the cover sheet reference letter "a" should indicate the line segment between point 36 and point 34.

Column 5, line 48, change "linearitys" to --linearities--.

Signed and sealed this 24th day of December 1974.

(SEAL)
Attest:

McCOY M. GIBSON JR.
Attesting Officer

C. MARSHALL DANN
Commissioner of Patents